United States Patent [19]
Mori et al.

[11] 4,247,529
[45] Jan. 27, 1981

[54] PROCESS FOR PRODUCING TITANIUM CARBONITRIDE

[75] Inventors: Tadaaki Mori, Tokyo; Takaaki Tsukidate, Shin Nanyo; Junji Arika, Tokuyama, all of Japan

[73] Assignee: Toyo Soda Manufacturing Co., Ltd., Shin Nanyo, Japan

[21] Appl. No.: 20,046

[22] Filed: Mar. 13, 1979

[30] Foreign Application Priority Data

Mar. 17, 1978 [JP] Japan .................................. 53/29880

[51] Int. Cl.$^3$ .............................................. C01C 3/08
[52] U.S. Cl. ...................................., 423/371; 423/380; 423/382
[58] Field of Search ............... 423/351, 364, 371, 380, 423/382; 106/43, 73.3

[56] References Cited

U.S. PATENT DOCUMENTS

| | | |
|---|---|---|
| 3,006,722 | 10/1961 | Sutherland ............................. 106/43 |
| 3,190,723 | 6/1965 | Jacobson ................................. 106/43 |
| 3,492,100 | 1/1970 | Roubin et al. ......................... 423/371 |
| 3,615,271 | 10/1971 | Dietz ...................................... 423/371 |
| 3,637,320 | 1/1972 | Wakefield ............................. 423/371 |
| 3,951,870 | 4/1976 | Economy et al. ..................... 423/371 |

*Primary Examiner*—O. R. Vertiz
*Assistant Examiner*—Wayne A. Langel
*Attorney, Agent, or Firm*—Cushman, Darby & Cushman

[57] ABSTRACT

Titanium carbonitride of a high purity and in a fine powder form can be produced by maintaining a mixture of titanium halide and carbon at a temperature of from 700° C. to 1,800° C. in the presence of a reducing substance, such as aluminum or an aluminum-titanium alloy, in a nitrogen-containing gaseous atmosphere.

3 Claims, 2 Drawing Figures

1 μ

1 μ

PROCESS FOR PRODUCING TITANIUM CARBONITRIDE

BACKGROUND OF THE INVENTION

1. Field of the Invention

This invention relates to a process for producing titanium carbonitride.

2. Description of the Prior Art

Titanium carbide (TiC)-base sintered alloys, which are generally produced by sintering titanium carbide together with molybdenum carbide ($Mo_2C$) or other carbides by using a nickel binder, have heretofore been used as high speed, light cutting tools. However, titanium carbide-base alloys are not suitable for high speed, heavy cutting tools and interrupted cutting tools because of their brittleness.

Recently, it has been proposed to use titanium carbonitride instead of titanium carbide as a base material for sintered alloys. Titanium carbonitride provides sintered alloys exhibiting enhanced toughness and transverse rupture as compared with conventional titanium carbide-base sintered alloys. The titanium carbonitride-base sintered alloys can be used as high speed, heavy cutting tools and interrupted cutting tools, i.e., widely used in cutting tool applications. Furthermore, titanium carbonitride exhibits enhanced thermal resistance and toughness, and consequently, the use thereof is expanding steadily in the fields of, for example, sintered hard metals and heat resisting alloys. For most applicantions of titanium carbonitride, titanium carbonitride of a high purity and of a fine powder form is desired.

Conventionally, titanium carbonitride is produced by a method wherein a uniform mixture of the predetermined proportion (i.e., corresponding to the intended titanium carbonitride composition TiCmNn) of a finely divided titanium carbide (TiC) and a finely divided titanium nitride (TiN) is compression molded, and then, the molded product is heated in a nitrogen atmosphere maintained at approximately 1,500° C., and finally, the product is pulverized, by using, for example, a ball mill, into a finely divided particle form. This conventional method is not advantageous for the following reasons. First, it is difficult to pulverize a sintered product of the obtained titanium carbonitride into a size of approximately one micron, and moreover, it cannot be avoided that, during the course of pulverization, foreign matters are incorporated into the sintered product and the sintered product is oxidized. Secondly, the sintered product is not always a homogeneous solid solution.

SUMMARY OF THE INVENTION

It is, therefore, the main object of the present invention to provide a method of producing titanium carbonitride, by which method a titanium carbonitride product having a high purity, an intended and uniform composition and a fine powder form can be obtained directly, i.e., without a pulverization operation.

Other objects and advantages of the present invention will be apparent from the following description.

In accordance with the present invention there is provided a process for producing titanium carbonitride, which comprises maintaining a mixture of titanium halide and carbon at a temperature of from 700° C. to 1,800° C., in the presence of a reducing substance, in a nitrogen-containing gaseous atmosphere.

DESCRIPTION OF THE PREFERRED EMBODIMENTS

Figure 1:
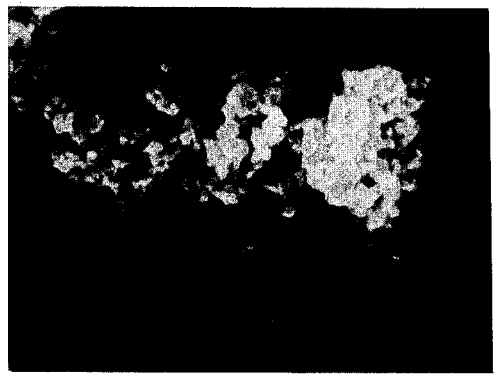
FIG. 1 is a scanning electron microscopic photograph (10,000×) of a finely divided titanium carbonitride ($TiC_{0.5}N_{0.5}$) obtained by the process of the invention.

Titanium halide used in the process of the invention includes, for example, titanium dichloride, titanium trichloride, titanium dibromide and titanium tribromide. These titanium halides are solid in an ordinary state and obtained usually in a finely divided powder form, and hence, convenient for being uniformly mixed with other reactants. Conventional carbonaceous materials may be used as the carbon source to be mixed with titanium halide. Particularly, acetylene black, carbon black and graphite are preferable.

The reducing substance used includes, for example, magnesium, aluminum and an aluminum-titanium alloy. These reducing substances may be used along or in combination. In the case where, for example, aluminum or an aluminum-titanium alloy is used as the reducing substance, the chemical reactions expressed by the following formulae (1) through (4) take place in the process of the invention.

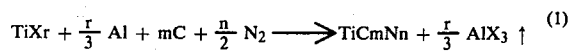
$$TiX_r + \frac{r}{3} Al + mC + \frac{n}{2} N_2 \longrightarrow TiC_mN_n + \frac{r}{3} AlX_3 \uparrow \quad (1)$$

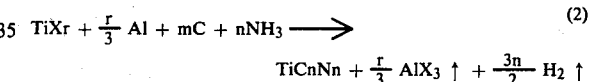
$$TiX_r + \frac{r}{3} Al + mC + nNH_3 \longrightarrow$$
$$TiC_nN_n + \frac{r}{3} AlX_3 \uparrow + \frac{3n}{2} H_2 \uparrow \quad (2)$$

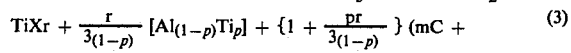
$$TiX_r + \frac{r}{3(1-p)} [Al_{(1-p)}Ti_p] + \{1 + \frac{pr}{3(1-p)}\} (mC + \quad (3)$$
$$\frac{n}{2} N_2) \longrightarrow \{1 + \frac{Pr}{3(1-p)}\} TiC_mN_n + \frac{r}{3} AlX_3 \uparrow$$

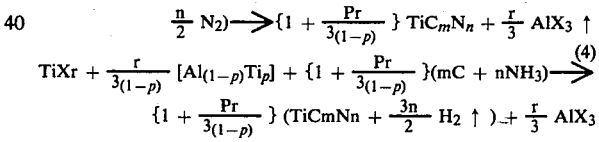
$$TiX_r + \frac{r}{3(1-p)} [Al_{(1-p)}Ti_p] + \{1 + \frac{Pr}{3(1-p)}\}(mC + nNH_3) \longrightarrow \quad (4)$$
$$\{1 + \frac{Pr}{3(1-p)}\} (TiC_mN_n + \frac{3n}{2} H_2 \uparrow) + \frac{r}{3} AlX_3$$

In the above chemical formulae, X is Cl or Br, r is 2 or 3, m is a fraction falling within the range of from 0.1 to 0.98, (m+n) is equal to 1 and $Al_{(l-p)}Ti_p$ represents an aluminum-titanium alloy having an aluminum/titanium atomic ratio of (l-p)/p where p is a positive decimal fraction.

As indicated in the above-mentioned chemical formulae, the metal halides produced by the respective chemical reactions sublime to be thereby readily expelled from the reaction mixture. Consequently, the rate of reaction is enhanced and the reaction product contains no or only a negligible amount of by-products. In this respect, aluminum and an aluminum-titanium alloy are preferably used as the reducing substance. Both aluminum and an aluminum-titanium alloy are converted into aluminum halide possessing a relatively low subliming temperature.

The amount of the reducing substance used may be varied within the range of from 0.8 to 1.1 times the stoichiometric amount thereof. The use of an approximately stoichiometric amount of the reducing substance is preferable. If the amount of the reducing substance is too small, unreacted titanium halide remains in the reaction product. In contrast, if the amount of the reducing substance is too great, a part of the reducing substance remains in the reaction product.

It is preferable that the reducing substance, such as aluminum and an aluminum-titanium alloy, be used in a finely divided powder form so that the reactions proceed smoothly. The preferable particle size of the reducing substance is not greater than 32 meshes, particularly not greater than 100 meshes.

The composition of the aluminum-titanium alloy is not particularly limited, but the aluminum-titanium alloy preferably contains less than approximately 80% by weight of titanium. When the content of titanium in the alloy is too large, the amount of titanium halide used as a reactant and the amount of aluminum halide produced can be reduced, but such alloy is difficult to pulverize into the desired small particle size.

Titanium carbonitride obtained by the process of the invention is expressed by the general formula $TiC_mN_n$, as indicated hereinbefore in the chemical formulae. The value represented by 'm' can be varied within the range of from 0.1 to 0.98 and the total of m and n is equal to one. In the practice of the process of the invention, titanium halide, the reducing substance and carbon may preferably be used in amounts approximately corresponding to the stoichiometric proportion defined according to the hereinbefore mentioned chemical formulae.

The mixture of titanium halide, the reducing substance and carbon may be used either in a finely divided powder form or in a granulated or molded form. The granulation or molding of the mixture should preferably be carried out in an inert gas atmosphere so that the respective reactants are maintained at a high purity.

After a reactor is flushed with an inert gas, the reactor is charged with the mixture of titanium halide, the reducing substance and carbon. Thereafter, the content in the reactor is heated to a temperature of from 700° C. to 1,800° C. while a nitrogen-containing gas is introduced therein. The nitrogen-containing gas may be selected from, for example, nitrogen, a mixture of nitrogen and hydrogen, and gaseous ammonia. When the reaction temperature is lower than 700° C., the reaction is not completed within a reasonable period of time. In contrast, when the reaction temperature is higher than 1,800° C., the resulting titanium carbonitride particles are liable to be coarse. The reaction period may suitably be varied depending upon the particular raw material and the reaction temperature. The reaction period is usually in the range of from 5 minutes to 24 hours, preferably in the range of from 10 minutes to 12 hours.

The reaction is preferably carried out in a stream of the nitrogen-containing gas. The flow rate of the nitrogen-containing gas should preferably be sufficient for the nitrogen containing gas to thoroughly contact the raw materials, thereby to cause the reaction to proceed smoothly, and further, sufficient for removing the sublimate or vaporized metal halide by-product from the reaction mixture.

The titanium carbonitride product obtained by the process of the invention is a substantially completely homogeneous solid solution. The nitrogen and carbon contents in the product are stoichiometrically determined according to the amounts of raw materials used. The titanium carbonitride product is obtained in a finely divided form and, hence, there is no need of a pulverization operation. Its purity and yield are at a high level.

The invention will be further illustrated by the following examples, in which percentages are by weight unless otherwise specified.

EXAMPLE 1

Two hundred grams of titanium trichloride (content of $AlCl_3 = 22.6\%$) having an average particle size of less than 200 mesh, 27 grams of finely divided aluminum having an average particle size of less than 325 mesh and 6 grams of graphite carbon having an average particle size of less than 200 mesh were thoroughly mixed together in a nitrogen gas atmosphere. The mixture was maintained at a temperature of 1,000° C., for a period of three hours, while a nitrogen gas was supplied thereto a flow rate of one liter/minute, thereby to cause carbonitrogenation to proceed.

Figure 2:
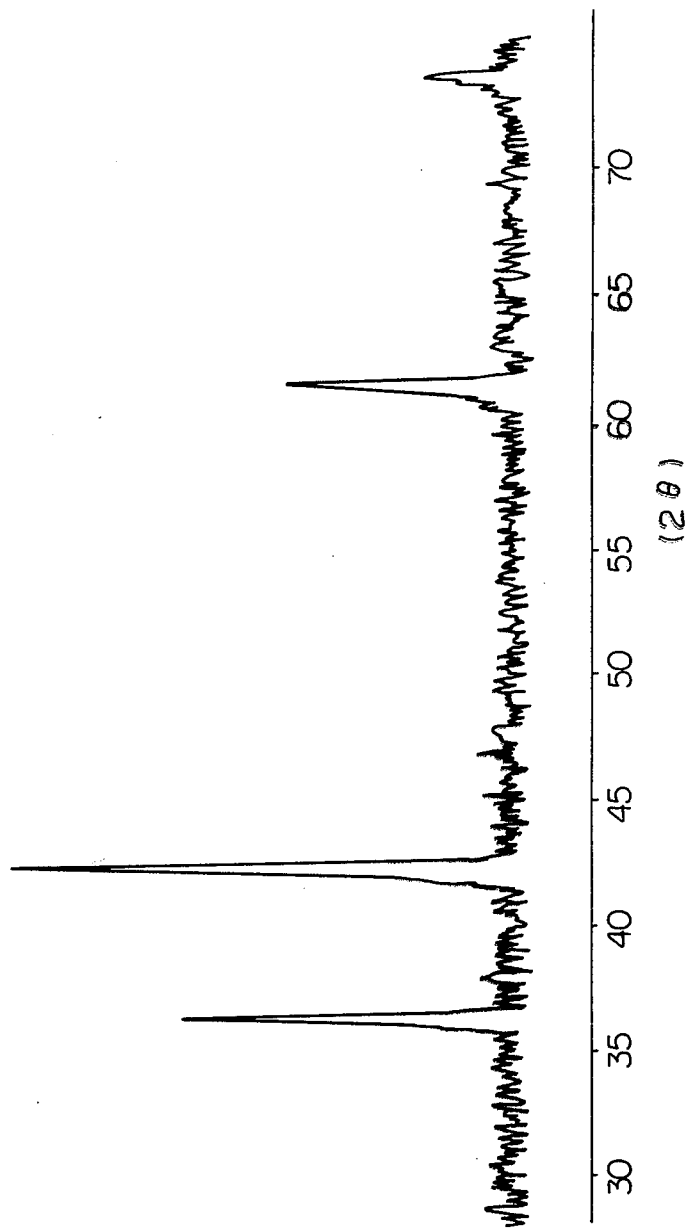
FIG. 2 is an X-ray diffraction pattern (Cu K) of the titanium carbonitride in FIG. 1.

Fifty five grams of a titanium carbonitride product in a fine powder form were obtained. This product was proved by a chemical analysis to contain 78.9% of titanium, 9.8% of carbon and 11.3% of nitrogen, i.e., to have a composition of $TiC_{0.5}N_{0.5}$. The particle size of the titanium carbonitride product was examined by using a scanning electron microscope. The product was found to be comprised of substantially uniform particles having a particle size of approximately 0.8 micron, as indicated in FIG. 1. The product exhibited an X-ray diffraction pattern as illustrated in FIG. 2, which showed that the product was a substantially complete solid solution with a lattice parameter "a" of 4.28 angstroms.

EXAMPLE 2

Thirty six grams of titanium dichloride, 20 grams of a finely divided aluminum-titanium alloy (comprised of 28% Al and 72% Ti) and 6 grams of carbon black were thoroughly mixed together in a nitrogen gas atmosphere. All these raw materials had an average particle size of less than 200 mesh. The mixture was maintained at a temperature of 1,200° C., for a period of one hour, while gaseous ammonia was supplied thereto at a flow rate of 0.5 liter/minute, thereby to cause carbonitrogenation to proceed.

Thirty-three grams of a titanium carbonitride product in a fine powder form were obtained. This product was proved by a chemical analysis to contain 78.8% of titanium, 15.8% of carbon and 4.6% of nitrogen, i.e., to have a composition of $TiC_{0.8}N_{0.2}$. The lattice parameter "a" was 4.30 angstroms.

EXAMPLE 3

One hundred and sixty grams of titanium trichloride (content of $AlCl_3 = 22.6\%$), having an average particle size of less than 200 mesh, 22 grams of finely divided aluminum having an average particle size of less than 325 mesh and 2 grams of graphite carbon having an average particle size of less than 200 mesh were thoroughly mixed together in a nitrogen gas atmosphere. The mixture was maintained at a temperature of 1,500° C., for a period of one hour, while a mixed gas of 90% by volume of nitrogen and 10% by volume of hydrogen was supplied thereto at a flow rate of 3.5 liters/minute, thereby to cause carbonitrogenation to proceed.

Forty-two grams of a titanium carbonitride product in a fine powder form were obtained. This product was proved by a chemical analysis to contain 77.9% of titanium, 4.8% of carbon and 16.8% of nitrogen, i.e., to have a composition of $TiC_{0.25}N_{0.75}$. The lattice parameter "a" was 4.25 angstroms.

EXAMPLE 4

Two hundred and eighty eight grams of titanium tribromide having an average particle size of less than 200 mesh, 28 grams of finely divided aluminum having an average particle size of 325 mesh and 6 grams of carbon black having an average particle size of 200 mesh were thoroughly mixed together in a nitrogen gas atmosphere. The mixture was maintained at a temperature of 1,000° C., for a period of six hours, while gaseous ammonia was supplied thereto at a flow rate of one liter/minute, thereby to cause carbonitrogenation to proceed.

Fifty-nine grams of a titanium carbonitride product in a fine powder form were obtained. This product was proved by a chemical analysis to contain 77.8% of titanium, 9.8% of carbon and 11.5% of nitrogen, i.e., to have a composition of $TiC_{0.5}N_{0.5}$. The lattice parameter "a" was 4.29 angstroms.

What we claim is:

1. A process for producing titanium carbonitride in powder form and in the form of a substantially completely homogeneous solid solution; said titanium carbonitride being expressed by the formula:

$$TiC_mN_n$$

wherein m is a positive number in the range of from 0.1 to 0.98 and n is (1−m), which process comprises heating a substantially uniform mixture of titanium halide powder and carbon in powder form to a temperature of from 700° to 1,800° C. in the presence of a reducing substance in powder form in a nitrogen-containing gaseous atmosphere; said titanium halide being at least one compound selected from the group consisting of titanium trichloride, titanium dichloride, titanium tribromide and titanium dibromide; and said reducing substance being at least one substance selected from the group consisting of aluminum and an aluminum-titanium alloy.

2. A process according to claim 1 wherein the nitrogen-containing gas is at least one gas selected from the group consisting of nitrogen, a mixture of nitrogen and hydrogen, and ammonia.

3. A process according to claim 1 comprising employing the carbon and nitrogen in such amount that m is 0.5 and n is 0.5.

* * * * *